(12) United States Patent
Wittrisch

(10) Patent No.: US 7,114,855 B2
(45) Date of Patent: Oct. 3, 2006

(54) CONNECTION DEVICE FOR OPTICAL FIBER

(75) Inventor: Christian Wittrisch, Rueil Malmaison (FR)

(73) Assignee: Institut Francais Du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 11/014,793

(22) Filed: Dec. 20, 2004

(65) Prior Publication Data

US 2005/0207708 A1   Sep. 22, 2005

(30) Foreign Application Priority Data

Dec. 19, 2003  (FR) .................................. 03 15200

(51) Int. Cl.
*G02B 6/38* (2006.01)
(52) U.S. Cl. .......................................... 385/55; 385/53
(58) Field of Classification Search ................. 385/53, 385/55

See application file for complete search history.

(56) References Cited

U.S. PATENT DOCUMENTS

| 4,030,810 A | 6/1977 | Khoe |
| 4,448,483 A | 5/1984 | Ryley, Jr. |
| 5,080,460 A | 1/1992 | Erdman et al. |
| 5,146,524 A * | 9/1992 | Berg ............................. 385/75 |
| 5,943,460 A | 8/1999 | Mead et al. |
| 2003/0147596 A1 | 8/2003 | Lancelle |

FOREIGN PATENT DOCUMENTS

| EP | 0 374 939 A2 | 12/1988 |
| EP | 0 298 144 A1 | 1/1989 |
| EP | 0 374 939 A3 | 6/1990 |
| FR | 2 316 611 | 6/1974 |
| JP | 63 017 406 | 1/1988 |
| WO | WO 00/49440 | 8/2000 |

* cited by examiner

*Primary Examiner*—Jennifer Doan
(74) *Attorney, Agent, or Firm*—Antonelli, Terry, Stout and Kraus, LLP.

(57) ABSTRACT

A connection device for optical fiber includes a fastener for fastening two optical fiber ends (13, 25), a centering and guide element for centering and contacting the two ends, and a chamber filled with a cleaning product for cleaning the contact faces of the two ends of the optical fibers. The fastener includes, for each fiber end to be connected, a set of conical jaws (14, 21) suited to hold and to center an end, each set comprises has a face (19, 20) suited to be in contact with the other face so as to allow the two ends of the fibers to coincide along the same axis. At least one of the faces has at least one orifice communicating with a first chamber which contains a cleaning fluid, the chamber including a displaceable bushing (31) for emptying the chamber, the bushing being activated as the faces approach one another for contacting.

9 Claims, 2 Drawing Sheets

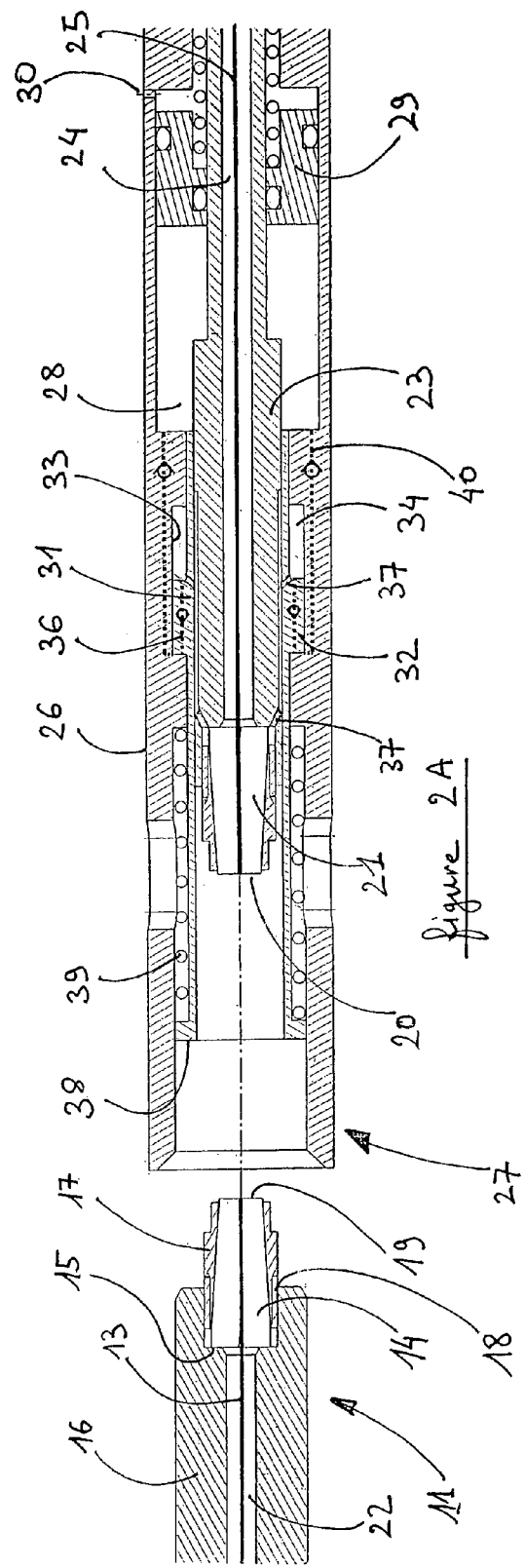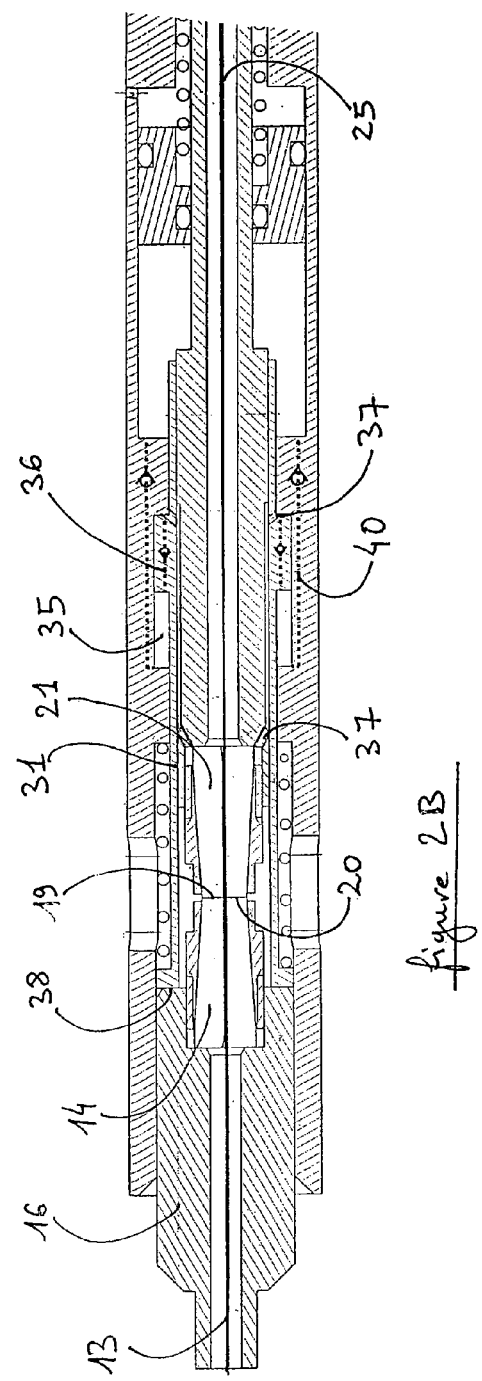

CONNECTION DEVICE FOR OPTICAL FIBER

FIELD OF THE INVENTION

The present invention relates to a device for connection of an optical fiber in a difficult environment, for example at the sea bottom or in a wellbore. In particular, the device is well suited to allow remote connection, without handling linking means.

BACKGROUND OF THE INVENTION

Such optical fiber connection means are already known in the oil drilling industry as "wet connect", for example for connecting to the surface, by means of an optical fiber, an array of detectors immersed in a well filled with drilling fluid, or for connecting an underwater control unit to the floating vessel.

However, none of these known connectors has the structure of the present invention, which notably affords advantages such as simplicity, excellent centering of the two optical fiber ends, and contact quality, which limits transmission losses.

SUMMARY OF THE INVENTION

The present invention thus relates to a connection device for optical fiber, comprising means for fastening two optical fiber ends, means for centering and contacting said two ends, means for cleaning the contact faces of the two optical fiber ends. The fastening means comprise, for each end of the two fibers to be connected, a set of conical jaws suited to hold and to center an end, each set comprising a face suited to be in contact with the other face so as to allow the two ends of the fibers to coincide along the same axis, and at least one of the faces comprises at least one orifice communicating with a first chamber which contains a cleaning fluid. The chamber comprises emptying means activated when said faces approach one another for contacting, i.e. as the two faces get closer to one another, a mechanism causes emptying of the first chamber so that the fluid appears or drips at the surface of the face before contact.

The emptying means can comprise a piston displaced by the motion of one face approaching the other.

The first chamber can comprise filling means activated upon disconnection.

A second chamber can communicate with the first chamber.

The piston can separate the first chamber from the second chamber.

A reserve chamber can communicate with the second chamber.

The jaws can comprise three parts forming a truncated cone, the fiber being held along the axis.

The two generatrices of the edges of each jaw part can be beveled so as to form a channel between each part, thus forming three lines along three generatrices of said truncated cone.

The contact faces can have a surface condition resulting from a buffing stage after fastening of the fiber in the jaws.

Locking means can hold the faces in contact.

BRIEF DESCRIPTION OF THE FIGURES

Other features and advantages of the present invention will be clear from reading the description hereafter of an embodiment, given by way of non limitative example, with reference to he accompanying figures wherein:

FIGS. 2A and 2B show, in partial sectional view, the two parts of the connector, connected or disconnected.

DETAILED DESCRIPTION

Figure 1:
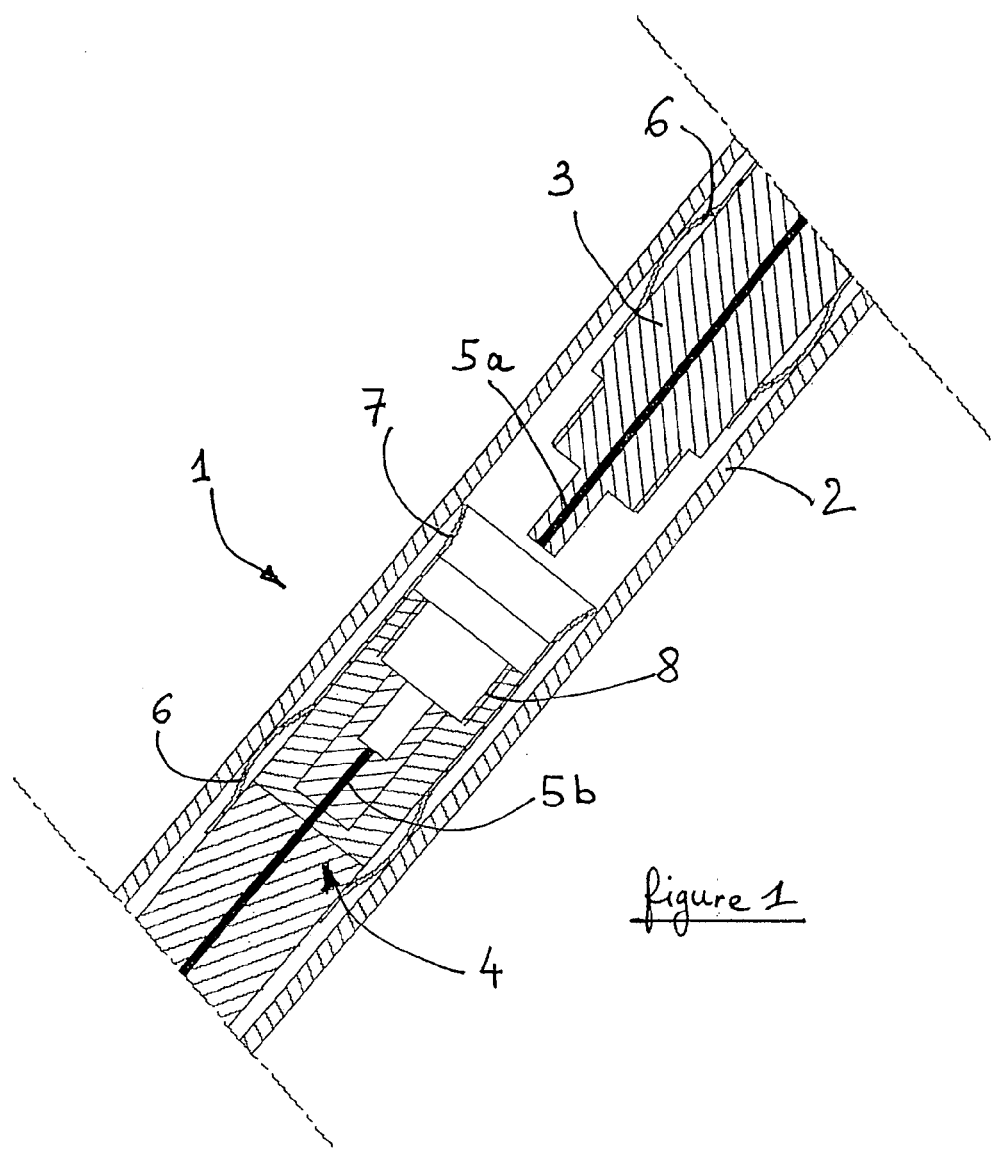
FIG. 1 shows the principle of an optical fiber connection in a pipe.

FIG. 1 diagrammatically illustrates the implementation of an optical fiber connection device, notably at the bottom of a well 1 cased by a pipe 2. In general, the well is filled with an aqueous or hydrocarbon-based fluid, which gives a rather unfavourable connection ambience. The connector comprises a male part 3 and a female part 4, shown disconnected in this figure. The ends 5a and 5b of an optical fiber are held in each part so that, after connection, the sections of the ends of the fiber are arranged opposite one another, with high centering precision considering the dimension of the core of standard fibers, monomode or multimode, generally ranging between 10 and 50 µm. Means 6 for centering the two parts allow them to be held substantially along the axis of pipe 2. In order to assemble the two parts by operating from the surface rods or cables connected to one of the two parts, the presence of guide means 7 is required. Furthermore, once connected, the two parts are locked in place by locking means 8 to prevent any untimely disconnection. The object of this purely diagrammatic FIG. 1 is merely to specify the various functions linked with the connector. There is another essential function (not shown in FIG. 1) which consists in providing means for cleaning the two faces of the fiber ends because the ambient medium, generally liquid, can greatly disturb transmission if the faces are not sufficiently clean.

Figures 3A, 3B:
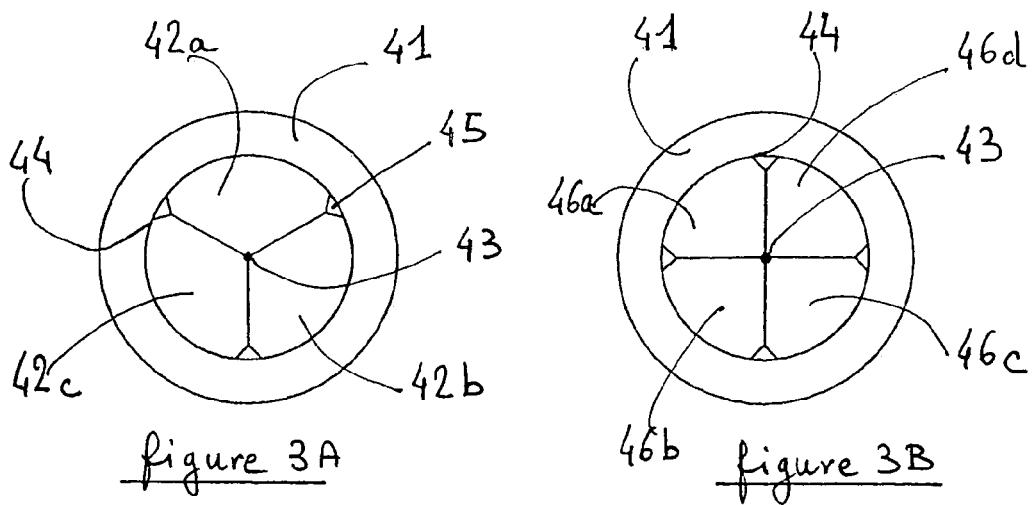
FIGS. 3A and 3B show, in cross-sectional view, two variants of the optical fiber fastening means.

FIGS. 2A and 2B show, in sectional view, an embodiment example, before and after connection respectively. FIG. 2A shows the presentation of male part 11 opposite the inlet of female part 12. The two ends of the optical fiber are fastened similarly in the two parts. End 13 of the optical fiber of the male part is held by a set of jaws 14 resting on a face 15 of a chuck 16. A bushing 17 screws through thread 18 onto the end of chuck 16 while holding the set of jaws still by cooperation of the male conical outer surface of the jaws and of the female conical inner surface of bushing 17. Optical fiber 13 runs through a bore 22 along the axis of chuck 16. Thus, the end of the optical fiber is centered and held with precision. Outer face 19 of the jaws is buffed once the optical fiber is mounted so as to obtain a surface condition allowing optimum contact with outer face 20 of jaws 21 of female part 12. FIGS. 3A and 3B show jaws 14 or 21 more in detail.

Female part 12 comprises a chuck 23 whose axis is perforated by a bore 24 allowing passage of optical fiber 25 to jaw fastening system 21. An outer bushing 26 is coaxial to chuck 23 and tightly secured to the chuck by linking means that are not shown in the figures, but understandable to the man skilled in the art. Reference number 27 designates the end of the bushing of the female part used as guide and centering means upon introduction of male part 11 for connection.

A reserve chamber 28 for a cleaning product, generally an optical gel or equivalent, is provided between chuck 23 and bushing 26. A piston 29 allows balancing of the internal pressure of chamber 28 with the external pressure of the ambient medium surrounding the connector, by means of an orifice 30.

A jacket 31 concentric to chuck 23 and internal to bushing 26 comprises a piston 32 which delimits, with a bore 33 in bushing 26, a first chamber 34 and a second chamber 35 (FIG. 2B), depending on the position of piston 32 in bore 33. This first chamber 34 communicates with face 20 through at least one line 37 and several lines along the jaws (FIGS. 3A and 3B). Second chamber 35 communicates with first chamber 34 through at least one line 36 comprising a nonreturn device allowing circulation in a single direction. The jacket ends with a bearing face 38 and comprises a return spring 39 whose function is to keep this jacket in "emptied second chamber 35" position.

First chamber 34 is filled with the cleaning product contained in reserve chamber 28.

Reserve chamber 28 communicates with second chamber 35 through at least one line 40 comprising a nonreturn device to allow circulation in a single direction.

FIG. 2B shows the two connected male and female parts. Chuck 16 has entered centering and guide means 27 and rests against end 38 of bushing 31. A connection force is necessary to compress return spring 39 so as to provide longitudinal motion of bushing 31 before contact between faces 19 and 20. The displacement of bushing 31 empties first chamber 34 by driving the cleaning product out of it through lines 37 on face 20 in form of one or more drops. Just before contact of faces 19 and 20, the volume of the cleaning product ejected has to be sufficient to drive the ambient liquid away so that, after contact, only traces of the cleaning product remain between the ends of the optical fibers. The cleaning product is so selected that the optical transmission is not disturbed by this product.

As first chamber 34 empties, second chamber 35 fills through line 40 with cleaning product coming from reserve chamber 28.

Upon disconnection of the male and female parts, return spring 39 causes longitudinal displacement of jacket 31 so as to empty second chamber 35 into first chamber 34 by means of line 36. The two chambers 34 and 35 must have equivalent volumes.

FIGS. 3A and 3B show, in front view, two embodiments of the means for holding the optical fiber by means of jaws. Reference number 41 represents the bushing concentric to the jaws which holds them in position. FIG. 3A shows a set of 3 jaws 42a, 42b, 42c which center and hold the core of an optical fiber 43. The edges 44 of each jaw, on the conical surface side, are machine beveled so as to form a channel 45 located between and along two consecutive jaws. These channels, whose number can be equal to the number of jaws, communicate through all of lines 37 (FIG. 2A) with first chamber 34.

FIG. 3B shows another embodiment comprising 4 jaws 46a, 46b, 46c, 46d.

The invention claimed is:

1. A connection device for optical fiber, comprising means for fastening two optical fiber ends, means for centering and contacting said two ends, means for cleaning the contact faces of the two optical fiber ends, characterized in that the fastening means comprise, for each fiber end to be connected, a set of conical jaws suited to hold and to center an end, each set comprising a face suited to be in contact with the other face so as to allow the two ends of the fibers to coincide along the same axis, and at least one of the faces comprises at least one orifice communicating with a first chamber which contains a cleaning fluid, said chamber comprising emptying means activated when said faces approach one another for contacting, wherein said emptying means comprise a piston displaced by the motion of one face approaching the other.

2. A device as claimed in claim 1, wherein said piston separates the first chamber from the second chamber.

3. A device as claimed in claim 1, wherein said contact faces have a surface condition resulting from a buffing stage after fastening of the fiber in the jaws.

4. A device as claimed in claim 1, wherein fastening means hold said faces in contact.

5. A connection device for optical fiber, comprising means for fastening two optical fiber ends, means for centering and contacting said two ends, means for cleaning the contact faces of the two optical fiber ends, characterized in that the fastening means comprise, for each fiber end to be connected, a set of conical jaws suited to hold and to center an end, each set comprising a face suited to be in contact with the other face so as to allow the two ends of the fibers to coincide along the same axis, and at least one of the faces comprises at least one orifice communicating with a first chamber which contains a cleaning fluid, said chamber comprising emptying means activated when said faces approach one another for contacting, wherein said first chamber comprises filling means activated upon disconnection.

6. A device as claimed in claim 5, wherein a second chamber communicates with first chamber.

7. A device as claimed in claim 6, wherein a reserve chamber communicates with the second chamber.

8. A connection device for optical fiber, comprising means for fastening two optical fiber ends, means for centering and contacting said two ends, means for cleaning the contact faces of the two optical fiber ends, characterized in that the fastening means comprise, for each fiber end to be connected, a set of conical jaws suited to hold and to center an end, each set comprising a face suited to be in contact with the other face so as to allow the two ends of the fibers to coincide along the same axis, and at least one of the faces comprises at least one orifice communicating with a first chamber which contains a cleaning fluid, said chamber comprising emptying means activated when said faces approach one another for contacting, wherein said jaws comprise three parts forming a truncated cone, the fiber being held along the axis.

9. A device as claimed in claim 8, wherein the two generatrices of the edges of each jaw part are beveled so as to form a channel between each part, thus forming three lines along three generatrices of said truncated cone.

* * * * *